United States Patent
Suematsu et al.

(10) Patent No.: US 6,793,403 B2
(45) Date of Patent: Sep. 21, 2004

(54) METHOD OF PRODUCING FERRULE AND FERRULE

(75) Inventors: Katsuki Suematsu, Tokyo (JP); Yasushi Kihara, Tokyo (JP); Masao Shinoda, Tokyo (JP); Jun Yamakawa, Tokyo (JP)

(73) Assignee: The Furukawa Electric Co., Ltd., Tokyo (JP)

( * ) Notice: Subject to any disclaimer, the term of this patent is extended or adjusted under 35 U.S.C. 154(b) by 223 days.

(21) Appl. No.: 09/960,100

(22) Filed: Sep. 20, 2001

(65) Prior Publication Data

US 2002/0076168 A1 Jun. 20, 2002

(30) Foreign Application Priority Data

Dec. 15, 2000 (JP) ........................................ 2000-382633
Apr. 27, 2001 (JP) ........................................ 2001-132147

(51) Int. Cl.$^7$ ................................................. G02B 6/36
(52) U.S. Cl. ............................ 385/80; 385/60; 385/72; 385/78
(58) Field of Search ................................ 385/80, 60–62, 385/78, 56, 72, 79, 81, 85, 87

(56) References Cited

U.S. PATENT DOCUMENTS

| | | | | |
|---|---|---|---|---|
| 4,708,433 A | * | 11/1987 | Kakii et al. | 385/54 |
| 4,952,263 A | * | 8/1990 | Kakii et al. | 156/153 |
| 5,611,010 A | * | 3/1997 | Shiino et al. | 385/53 |
| 6,062,740 A | * | 5/2000 | Ohtsuka et al. | 385/81 |
| 6,276,842 B1 | * | 8/2001 | Xu et al. | 385/85 |
| 6,478,473 B1 | * | 11/2002 | Hirao | 385/59 |
| 6,478,475 B2 | * | 11/2002 | Schofield et al. | 385/65 |

FOREIGN PATENT DOCUMENTS

JP 63296008 A * 12/1988 ............ G02B/6/36

* cited by examiner

Primary Examiner—Frank G. Font
Assistant Examiner—Kevin C Kianni
(74) Attorney, Agent, or Firm—Oblon, Spivak, McClelland, Maier & Neustadt, P.C.

(57) ABSTRACT

A method for producing a ferrule having a plurality of fiber holes for insertion of optical fibers formed between two pin holes for insertion of guide pins, and a ferrule produced by the method. The method comprises a step of injecting a synthetic resin in a mold for forming the ferrule while holding a plurality of pins with a Young's modulus of $(22$ to $59) \times 10^{10} N/m^2$ for forming the fiber holes at two points separated by a distance of 1.5 to 4 mm in a lengthwise direction of the pins.

4 Claims, 7 Drawing Sheets

METHOD OF PRODUCING FERRULE AND FERRULE

FIELD OF THE INVENTION

The present invention relates to a method of producing a ferrule and a ferrule.

BACKGROUND OF THE INVENTION

A ferrule 1 for a multi-fiber connector as shown in FIG. 12, for example, has a flange 1b of a synthetic resin at the rear portion of a body 1a whose rear portion from nearly the center has a cylindrical shape, and an opening 1c formed in the center of the body 1a. The ferrule 1 has two pin holes 1d formed in the lengthwise direction for insertion of guide pins and a plurality of fiber holes 1e for insertion of optical fibers formed between the two pinholes 1d.

The ferrule 1 is assembled into an optical connector by inserting optical fibers into the fiber holes 1e from back, injecting an adhesive through the opening 1e to adhere the optical fibers into the fiber holes 1e, and sealing the opening 1c with the adhesive.

SUMMARY OF THE INVENTION

Accordingly, it is an object of the present invention to provide a ferrule producing method and a ferrule which can prevent fiber holes from being bent at the time of molding and can form the fiber holes accurately.

To achieve the objective, according to the present invention, a method of producing a ferrule having a plurality of fiber holes for insertion of optical fibers formed between two pin holes for insertion of guide pins, which comprises a step of injecting a synthetic resin in a mold for forming the ferrule while holding a plurality of pins with a Young's modulus of $(22 \text{ to } 59) \times 10^{10} \text{N/m}^2$ for forming the fiber holes at two points separated by a distance of 1.5 to 4mm in a lengthwise direction of the pins.

To achieve the object, a first ferrule according to the present invention, produced by the method as described above, comprises pin holes for insertion of guide pins; a plurality of fiber holes for insertion of optical fibers, formed between the pin holes; and an opening which communicates with the plurality of fiber holes and through which an adhesive for securely adhering the optical fibers in the fiber holes is injected.

To achieve the object, a second ferrule according to the present invention comprises plural groups of fiber holes for insertion of optical fibers formed at predetermined intervals, each group having a plurality of fiber holes. Each fiber hole has a guide hole portion and a minute hole portion whose inside diameter is smaller than that of the guide hole portion.

To achieve the object, a third ferrule according to the present invention, comprises plural groups of fiber holes for insertion of optical fibers formed at predetermined intervals, each group having a plurality of fiber holes. Each fiber hole has a guide hole portion and a minute hole portion whose inside diameter is smaller than that of the guide hole portion. The guide hole portion has a taper portion formed on a minute hole portion side in such a way that the taper portion is tapered toward the minute hole portion and has a length Lt set to $1 \geq Lt/Lg \geq \frac{1}{3}$ where Lg is a total length of the guide hole portion.

To achieve the object, a fourth ferrule according to the present invention, comprises plural groups of fiber holes for insertion of optical fibers formed at predetermined intervals, each group having a plurality of fiber holes. Each fiber hole has a guide hole portion and a minute hole portion whose inside diameter is smaller than that of the guide hole portion. The guide hole portion is formed in such a way that the inside diameter thereof becomes smaller in a stepwise manner toward the minute hole portion.

To achieve the object, a fifth ferrule according to the present invention, comprises plural groups of fiber holes for insertion of optical fibers formed at predetermined intervals, each group having a plurality of fiber holes. Each fiber hole has a guide hole portion and a minute hole portion whose inside diameter is smaller than that of the guide hole portion. The guide hole portion is formed in such a way that the inside diameter thereof becomes smaller continuously toward the minute hole portion.

The above and other objects of the present invention and the features and advantages thereof will become more apparent from the following detailed description, taken in conjunction with the accompanying drawings.

DETAILED DESCRIPTION

A ferrule producing method and a ferrule according to a first embodiment of the present invention will now be described referring to FIGS. 1 through 6.

Figure 1:
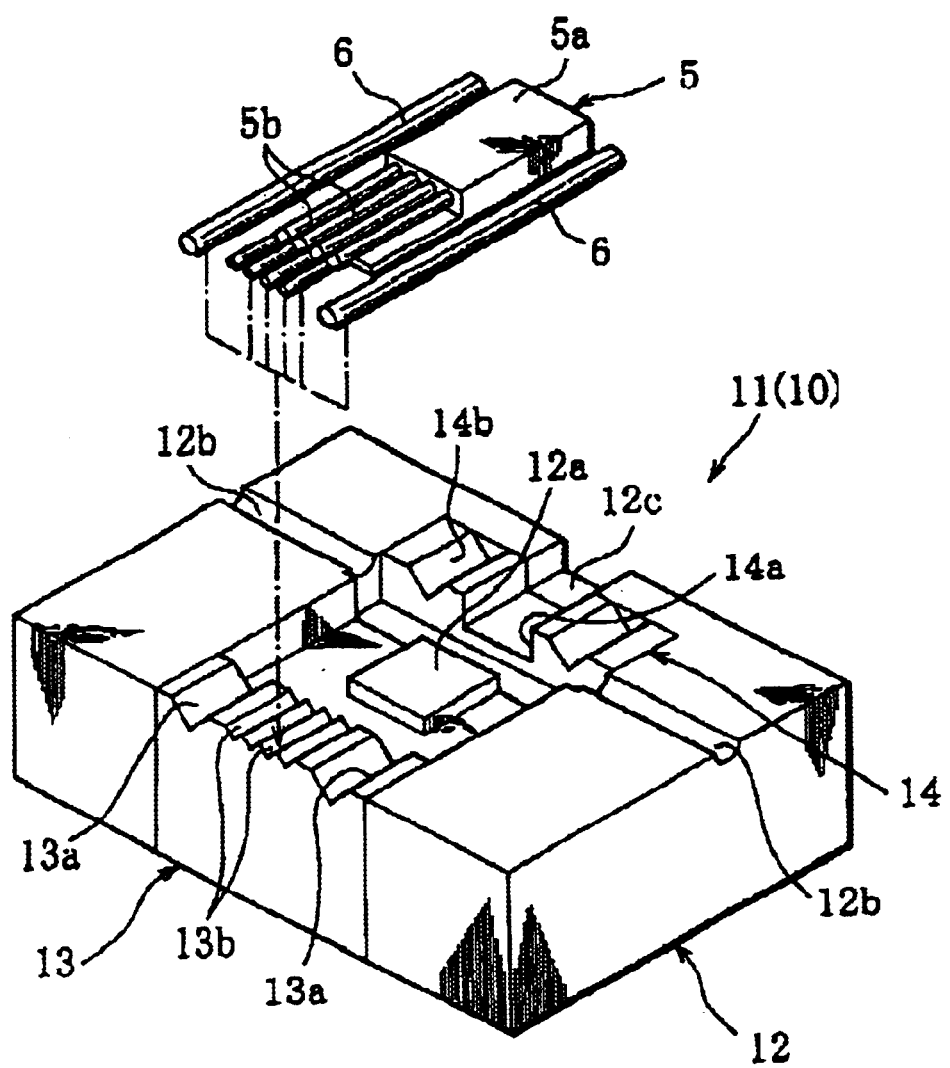
FIG. 1 is a perspective view showing a lower mold, a core and molding pins which are used in a ferrule producing method according to the present invention.
Figure 2:
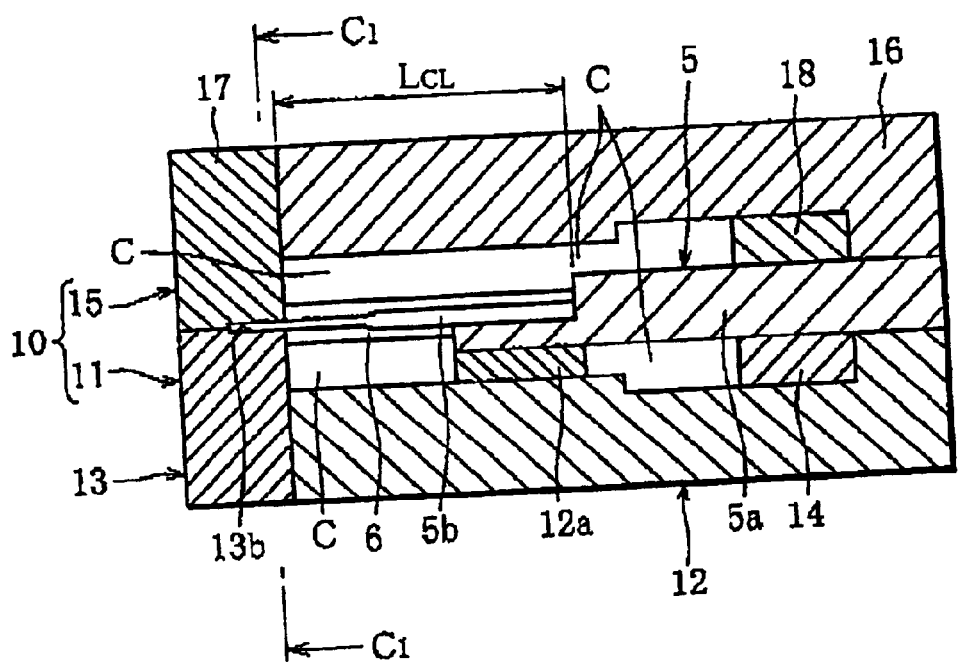
FIG. 2 is a cross-sectional view showing a mold closed, which is used in the ferrule producing method according to the present invention.
Figure 12:
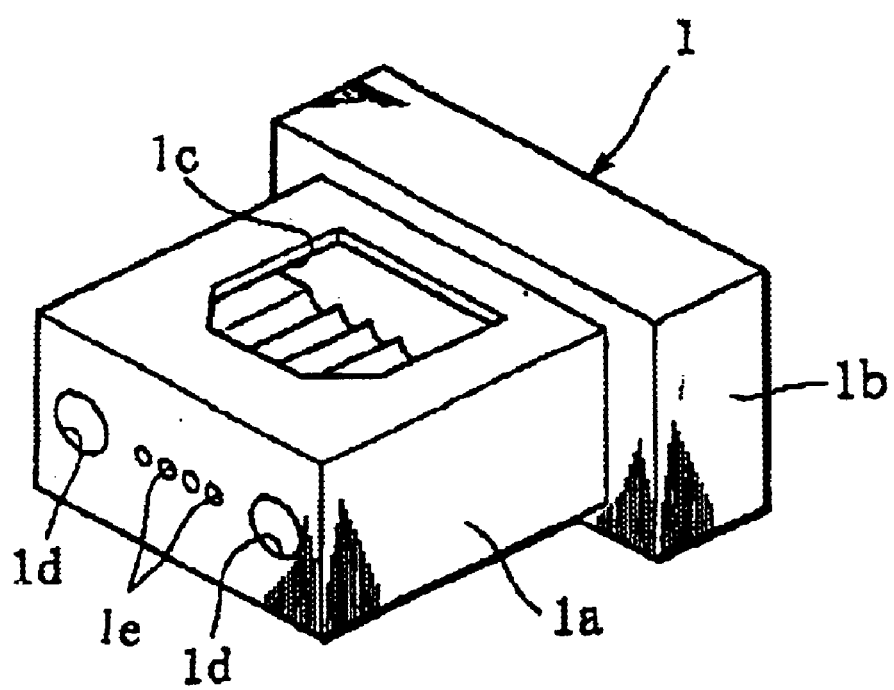
FIG. 12 is a perspective view of a ferrule which is produced by a conventional method and a first ferrule which is produced by the present invention.

According to the method of the present invention, a first ferrule of the present invention is produced by using a mold 10 having a core 5, molding pins 6, a lower mold 11 and an upper mold 15 as shown in FIGS. 1 and 2. The method according to the present invention can be used to produce a conventional ferrule 1 shown in FIG. 12. Therefore, how to produce the ferrule 1 using the method according to the present invention will be described below.

As shown in FIG. 1, the core 5 has a body 5a provided with four molding pins 5b which serve to form fiber holes 1e. The molding pins 5b are formed of a metal, such as steel or a super hard alloy, which has a Young's modulus of (22 to 59)×10$^{10}$N/m$^2$. As shown in FIG. 2, the molding pins 5b have one ends supported at two points between first positioning blocks 13 and 17 to be discussed later and the other ends supported via the body 5a at two points between second positioning blocks 14 and 18 to be discussed later. The lengths of the body 5a and the molding pins 5b of the core 5 are set in such a way that as shown in FIG. 2, a holding distance $L_{CL}$ in the lengthwise direction of the molding pins 5b which is equivalent to the distance between the mentioned two points becomes 1.5 to 4 mm when the core 5 is set in the mold 10.

The molding pins 6, which are larger in diameter than the molding pins 5b that form the fiber holes 1e, form pin holes 1d.

The lower mold 11 has a base block 12, the first positioning block 13 and the second positioning block 14 as shown in FIG. 2.

The first positioning block 13 is placed on the front portion of the base block 12, and the second positioning block 14 is placed on the rear portion of the base block 12. A support block 12a is placed on the base block 12 at the portion where an opening 1c of the ferrule 1 is to be formed. As shown in FIG. 1, the base block 12 has grooves 12b which form the passage for a resin are formed in the widthwise direction in the side portions of the base block 12 that are adjoining to the second positioning block 14 and correspond to a flange 1b of the ferrule 1. The base block 12 has a recess 12c formed at the position that corresponds to a recess 14a in the second positioning block 14. The recess 12c has the same shape as the recess 14a.

Figure 3:
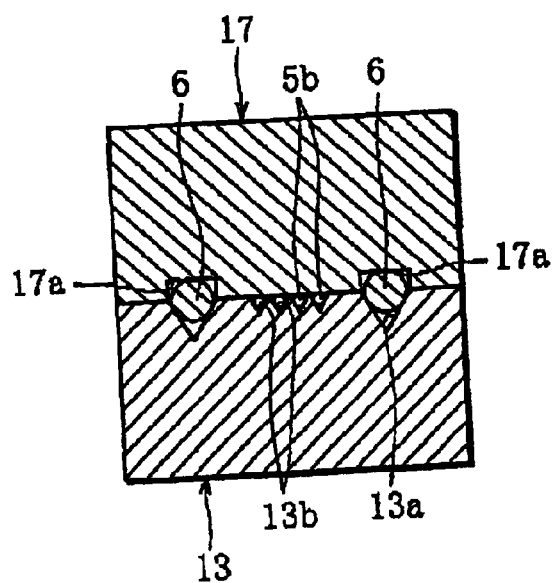
FIG. 3 is a cross-sectional view taken along the line C1—C1 in FIG. 2.

As shown in FIGS. 1 and 3, the first positioning block 13 has V-shaped grooves 13a formed in the top surface on the right and left sides and V-shaped grooves 13b formed between the V-shaped grooves 13a. The molding pins 6 are to be placed in the V-shaped grooves 13a, and the molding pins 5b are to be placed in the V-shaped grooves 13b.

As shown in FIG. 1, the second positioning block 14 has the recess 14a formed in the center in the widthwise direction and V-shaped grooves 14b formed on both sides of the recess 14a. The body 5a of the core 5 is to be placed in the recess 14a, and the molding pins 6 are to be placed in the V-shaped grooves 14b.

The upper mold 15 has a base block 16, the first positioning block 17 and the second positioning block 18 and is constructed in approximately the same manner as the lower mold 11. To avoid their redundant description, therefore, similar symbols will be given to the corresponding members in the diagrams and the following description. It is to be noted however that the first positioning block 17 has recesses 17a, not V-shaped-grooves, where the molding pins 6 are to be placed, and has no V-shaped grooves formed where the molding pins 5b are to be placed.

In producing the ferrule 1 using the mold 10, first, the core 5 and the two molding pins 6 are set in the lower mold 11 by using the first positioning block 13 and the second positioning block 14.

At this time, each molding pin 6 should be placed in the associated V-shaped groove 13a and V-shaped groove 14b. The body 5a of the core 5 is placed in the lower mold 11 using the recess 14a and the support block 12a, and the individual molding pins 5b are placed in the associated V-shaped grooves 13b.

Next, the upper mold 15 is put over the lower mold 11 from the above to close the mold 10 as shown in FIG. 2. As a result, the lower mold 11 and the upper mold 15 form a cavity C (see FIG. 2) for molding the ferrule 1 and the grooves 12b and grooves (not shown) in the base block 16 form a passage for a synthetic resin at the position that corresponds to the side portions of the flange 1b. In the closed mold 10, one end of each molding pin 5b is held by the associated V-shaped groove 13b and the first positioning block 17 and the other end of each molding pin 5b is held by the second positioning blocks 14 and 18 via the body 5a of the core 5, as shown in FIG. 3.

Then, a molten synthetic resin, such as a polyphenylene sulfide (PPS) resin or epoxy resin, is injected into the cavity C through the resin passage. As a result, the ferrule 1 shown in FIG. 12 which corresponds in shape to the cavity C is molded. After a predetermined time passes, the mold 10 is opened and the molded ferrule 1 is removed.

The molten synthetic resin is injected into the cavity C under high pressure. As the molding pins 5b are formed of a metal having a Young's modulus of (22 to 59)×10$^{10}$N/m$^2$ and have one ends held by the first positioning blocks 13 and 17 and the other held by the second positioning blocks 14 and 18 via the body 5a of the core 5 as shown in FIG. 2, the pressure injection of the synthetic resin at the molding time does not deform the molding pins 5b in the method of the present invention. Therefore, the method of the present invention does not bend the fiber holes and produces the ferrule 1 with a high precision of forming the fiber holes.

As apparent from the above, unlike an optical connector which uses the conventional ferrule, an optical connector which uses the ferrule 1, when butt-jointed to another optical connector, prevents slight misalignment of the optical axes of associated optical fibers, thereby suppressing an increase in the joint loss.

Figure 4:
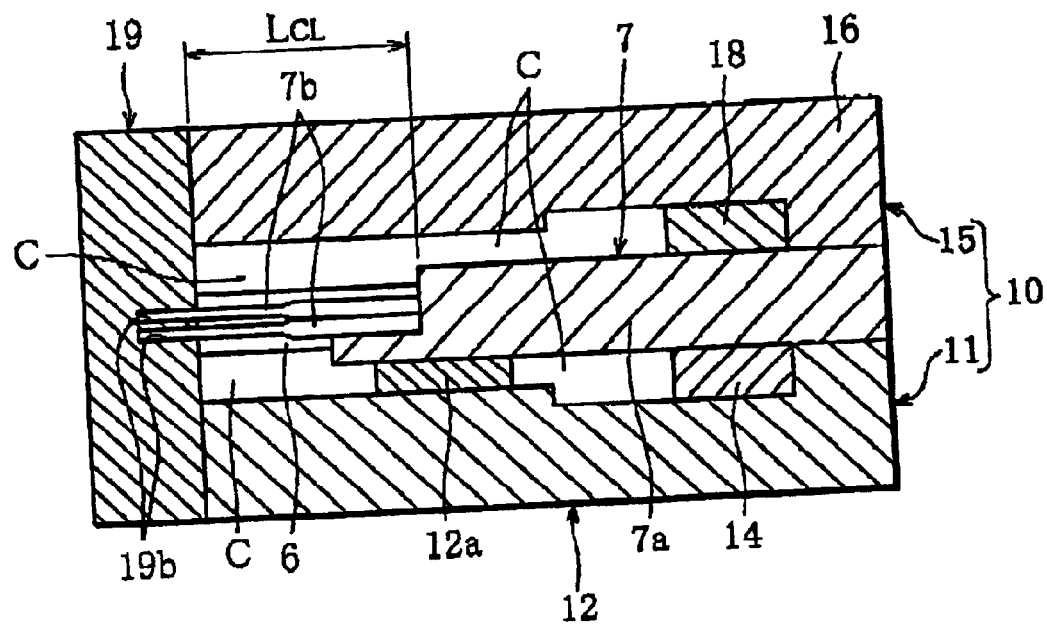
FIG. 4 is a cross-sectional view showing a modification of the core which is used in the ferrule producing method according to the present invention, with the mold closed.
Figure 5:
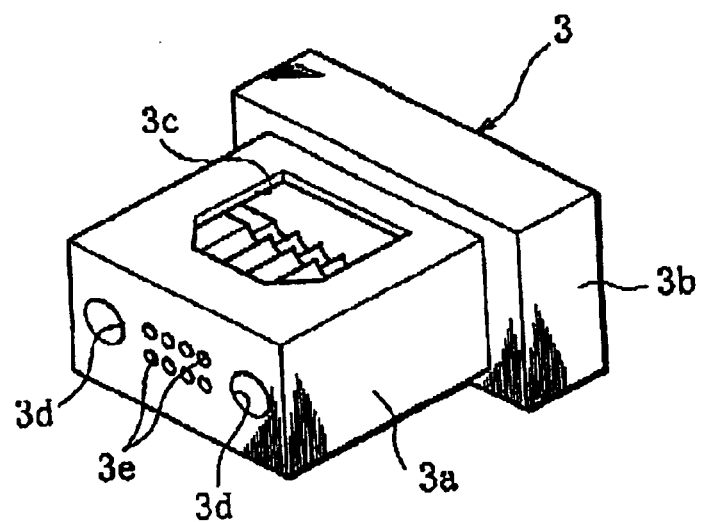
FIG. 5 is a perspective view of a ferrule according to one example of the present invention, which is produced by using the core in FIG. 4.

In case where the core 5 is replaced with a core 7 in whose body 7a two rows of molding pins 7b, each row containing four molding pins, which form fiber holes are formed one above the other as shown in FIG. 4, it is possible to produce a ferrule 3 which has two rows of fiber holes 3e, each row containing four fiber holes, formed one above the other as shown in FIG. 5.

The ferrule 3 has a flange 3b formed at the rear portion of its body 3a and an opening 3c formed in the center of the body 3a, and the portion extending rearward from nearly the center of the body 3a has a cylindrical shape. The ferrule 3 has two pin holes 3d for insertion of guide pins formed in the lengthwise direction, and two rows of fiber holes 3e for insertion of optical fibers formed one above the other between the two pin holes 3d.

At this time, the molding pins 7b are made of the same material as that of the molding pins 5b in the core 5, and the lengths of the body 7a and the molding pins 7b are set in such a way that the illustrated holding distance $L_{CL}$ becomes 1.5 to 4 mm.

Figure 6:
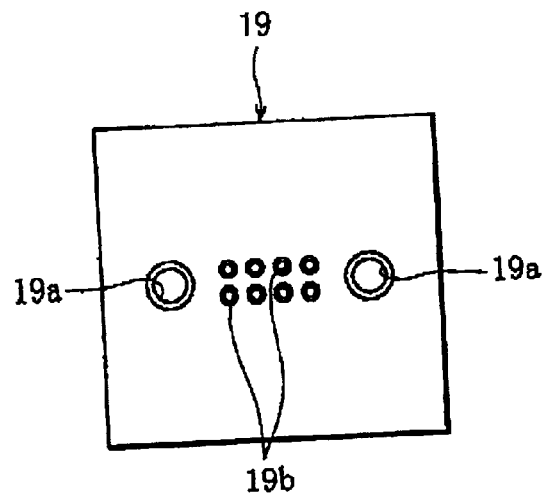
FIG. 6 is a front view of positioning blocks which are used when the core in FIG. 4 is in use.

When the core 7 is used, the distal ends of the molding pins 7b and the molding pins 6 are positioned by a positioning block 19 shown in FIG. 6 instead of the first positioning blocks 13 and 17. The positioning block 19 has positioning holes 19a formed therein on the right and left sides in which the distal ends of the molding pins 6 are inserted to be positioned, and two rows of positioning holes 19b formed one above the other between the two positioning holes 19a, each row containing four positioning holes 19b. The positioning holes 19b position the respective molding pins 7b.

Second to fifth ferrules that achieve the object of the present invention will be described with reference to FIGS. 7 to 11.

Figure 7:
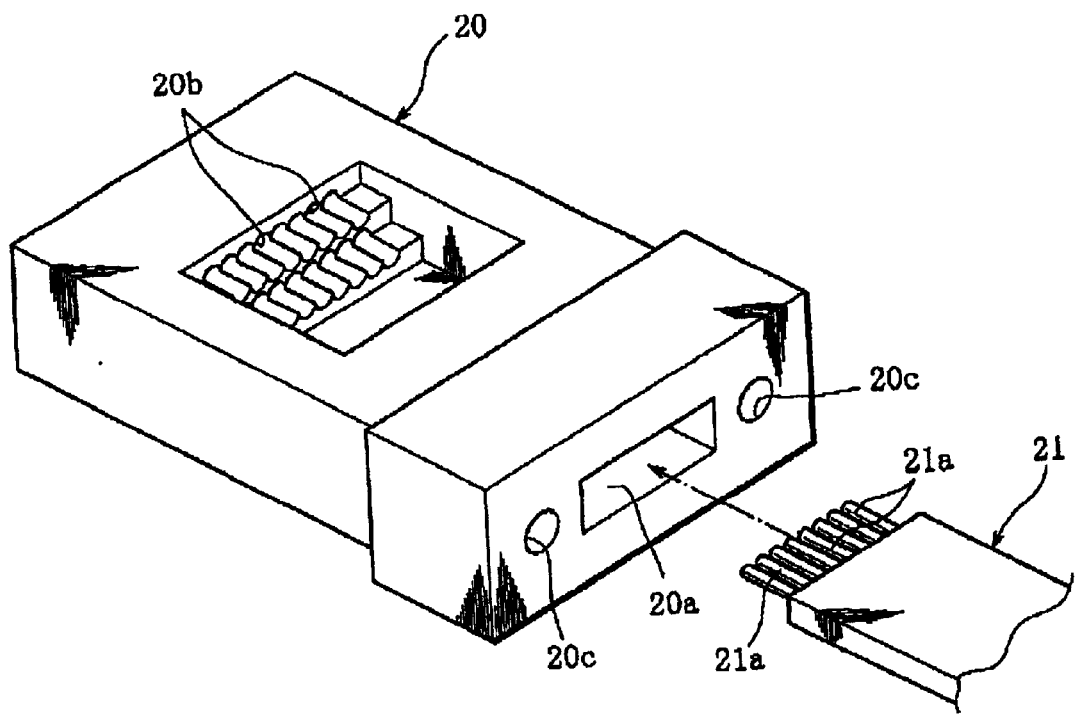
FIG. 7 is a perspective view relating to second and third ferrules according to the present invention.
Figure 8:
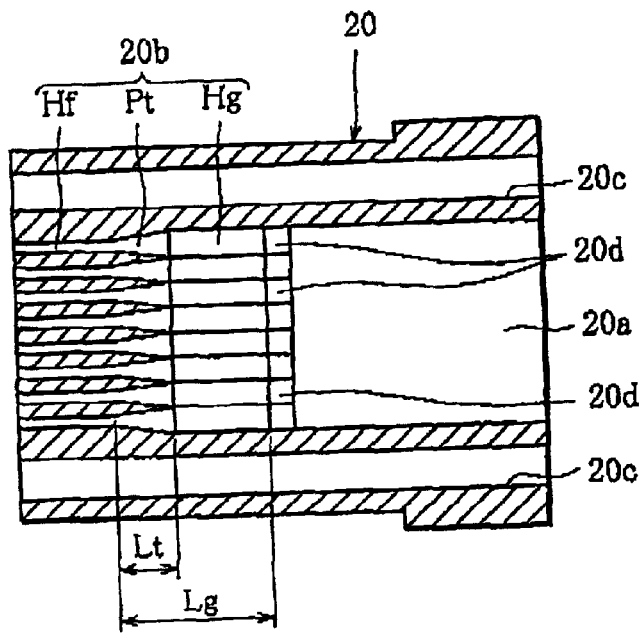
FIG. 8 is a cross-sectional view showing the ferrule in FIG. 7 along a horizontal plane.

A ferrule 20 shown in FIGS. 7 and 8 relates to the second and third ferrules. The ferrule 20 has an insertion port 20a, a plurality of fiber holes 20b and pin holes 20c.

The insertion port 20a has the front side which communicates with the fiber holes 20b and the rear side which is open at the rear portion of the ferrule 20 and where a tape fiber 21 is inserted. The fiber holes 20b are arranged in two rows, one over the other at a predetermined interval. Individual optical fibers 21a of the tape fiber 21 inserted through the insertion port 20a are inserted into the respective fiber holes 20b. When the ferrule 20 is butt-jointed to another optical connector ferrule, positioning guide pins (not shown) are inserted in the pin holes 20c.

As shown in FIGS. 7 and 8, the fiber holes 20b have guide grooves 20d provided on the rear side which guide the optical fibers 21a of the tape fiber 21 inserted through the insertion port 20a to the respective fiber holes 20b.

As shown in FIG. 8, each fiber hole 20b has a guide hole portion Hg and a minute hole portion Hf whose inside diameter is smaller than that of the guide hole portion Hg. The inside diameter of the guide hole portion Hg is set larger than the outside diameter of the optical fiber 21a to facilitate the insertion of the optical fiber 21a into the molded ferrule 20. The guide hole portion Hg has a taper portion Pt formed on the minute hole portion (Hf) side in such a way that the taper portion Pt is tapered toward the minute hole portion Hf. The length, Lt, of the taper portion Pt of the guide hole portion Hg is set to $1 \geq Lt/Lg \geq 1/3$ where Lg is the total length of the guide hole portion Hg.

With the taper portion Pt, the guide hole portion Hg can permit smooth insertion of the associated optical fiber 21a into the small-diameter minute hole portion Hf.

Figure 9:
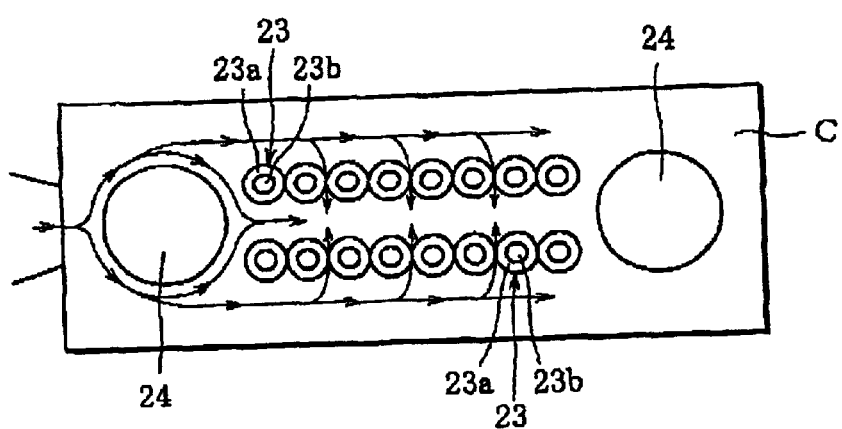
FIG. 9 is a model explanatory diagram showing the molding state of the ferrule in FIG. 7 along a horizontal plane.

The ferrule 20 with the above-described structure is produced as follows. As shown in FIG. 9, molding pins 23 for forming the fiber holes 20b and molding pins 24 for forming the pin holes 20c are placed in a cavity C formed by the mold. Then, the ferrule 20 is produced by transfer molding by which a thermosetting resin, such as an epoxy resin, is injected into the cavity C or injection molding by which a thermoplastic resin, such as polyphenylene sulfide (PPS), is injected into the cavity C.

As shown in FIG. 9, each of the molding pins 23 for forming the fiber holes 20b has a large-diameter portion 23a for forming the guide hole portion Hg, a small-diameter portion 23b for forming the minute hole portion Hf, and a tapered portion formed between the large-diameter portion 23a and the small-diameter portion 23b in association with the taper portion Pt. The length of the tapered portion is set to $1 \geq Lt/Lg \geq 1/3$ to match with the length Lt of the taper portion Pt. At the time of molding the ferrule 20, the molding pins 23 are laid in the cavity C with their adjoining large-diameter portions 23a contacting one another.

Accordingly, the small-diameter portion 23b for forming the minute hole portion Hf is not in contact with the tapered portion, thus forming an extra clearance corresponding to the tapered portion as compared with the prior art.

At the time of molding the ferrule 20, therefore, the resin flows into space S between the upper and lower rows of molding pins 23 through the clearances each corresponding to the tapered portion in addition to the clearances that are formed between the small-diameter portions 23b as indicated by arrows in FIG. 9. Therefore, the resin flows into the space S between the upper and lower rows of molding pins 23 and the other-portion of the cavity C approximately at the same time without a delay. This prevents the molding pins 23 from being bent by the resin pressure. Therefore, the fiber holes of the molded ferrule are not curved and are formed with high precision.

At the time of producing the conventional ferrule that does not have the taper portions Pt of the length Lt. by way of contrast, the tapered portions corresponding to the taper portions Pt are not formed unlike in the present invention. At the time of producing the conventional ferrule, therefore, the resin does not flow into space S between the upper and lower rows of molding pins through the clearances corresponding to the tapered portions.

At the time of producing the conventional ferrule, therefore, the resin flows into the space S between the upper and lower rows of molding pins with a delay after flowing into the other portion of the cavity C. The flow of the resin therefore applies large external stress to the molding pins for forming the fiber holes. Particularly, with reference to FIG. 9, those molding pins 23 in the upper and lower rows of molding pins 23 which are located near the center in the layout direction are pressed and bent in the direction to come closer to each other (up and down direction in FIG. 9), resulting in unstable positioning. As a result, the molded ferrule has curved fiber holes, lowering the fiber-hole forming precision.

Although the resin is injected into the cavity C from the sides of the mold in FIG. 9, the same advantages are obtainable in producing the ferrule if the resin is injected from above.

An embodiment which relates to a fourth ferrule of the present invention will be described with reference to FIG. 10.

A ferrule 25 has an insertion port 25a, a plurality of fiber holes 25b and pin holes 25c.

The insertion port 25a has the front side which communicates with the fiber holes 25b and the rear side which is open at the rear portion of the ferrule 25 and where a tape fiber (not shown) is inserted.

The fiber holes 25b are arranged in two rows, one over the other at a predetermined interval. The individual optical fibers (not shown) of the tape fiber inserted through the insertion port 25a are inserted into the respective fiber holes 25b. The fiber holes 25b have guide grooves 25d provided on the rear side which guide the associated optical fibers (not shown) inserted through the insertion port 25a to the respective fiber holes 25b.

Figure 10:
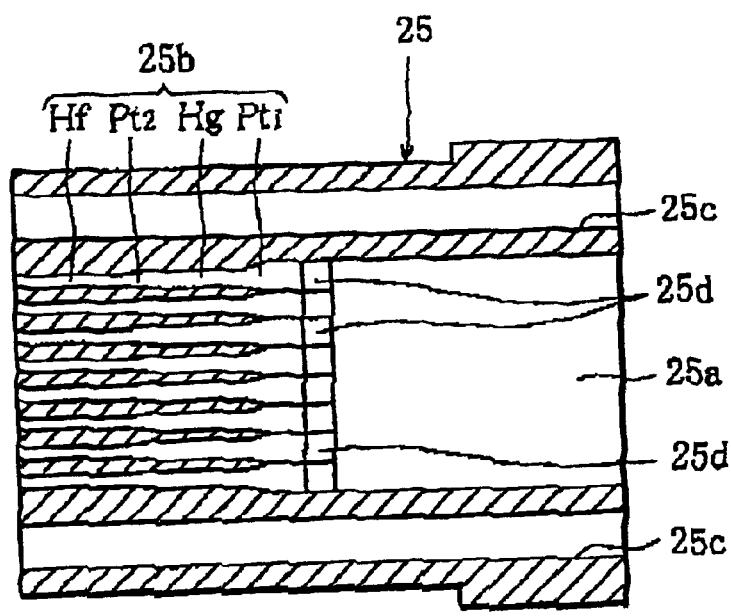
FIG. 10 is a cross-sectional view of a fourth ferrule according to the present invention.

As shown in FIG. 10, each fiber hole 25b has q guide hole portion Hg and a minute hole portion Hf whose inside diameter is smaller than that of the guide hole portion Hg. The guide hole portion Hg is formed in such a way that the inside diameter becomes smaller in two stages by a first taper portion Pt1 formed on the guide groove (25d) side. The guide hole portion Hg also has a second taper portion Pt2 formed between the first taper portion Pt1 and the minute hole portion Hf.

When the ferrule 25 is butt-jointed to another optical connector ferrule, positioning guide pins (not shown) are inserted in the pin holes 25c.

In molding the ferrule 25 with the above-described structure, a clearance (space) is produced to the left of the first taper portion Pt1 in FIG. 10 between the adjoining ones of the molding pins that form the fiber holes 25b and are laid in the cavity of the mold. At the time of molding the ferrule 25, therefore, the resin flows into the space between the upper and lower rows of molding pins through the clearance. Like the ferrule 20, the ferrule 25 ensures stable positioning of the molding pins for forming the fiber holes 25b so that the fiber holes 25b are formed with a high accuracy.

An embodiment which relates to a fifth ferrule of the present invention will be described with reference to FIG. 11.

A ferrule 27 has an insertion port 27a, a plurality of fiber holes 27b and pin holes 27c.

The insertion port 27a has the front side which communicates with the fiber holes 27b and the rear side which is open at the rear portion of the ferrule 27 and where a tape fiber (not shown) is inserted.

The fiber holes 27b are arranged in two rows, one over the other at a predetermined inter. The individual optical fibers (not shown) of the tape fiber inserted through the insertion port 27a are inserted into the respective fiber holes 27b. The fiber holes 27b have guide grooves 27d provided on the rear side which guide the associated optical fibers (not shown) inserted through the insertion port 27a to the respective fiber holes 27b.

Figure 11:
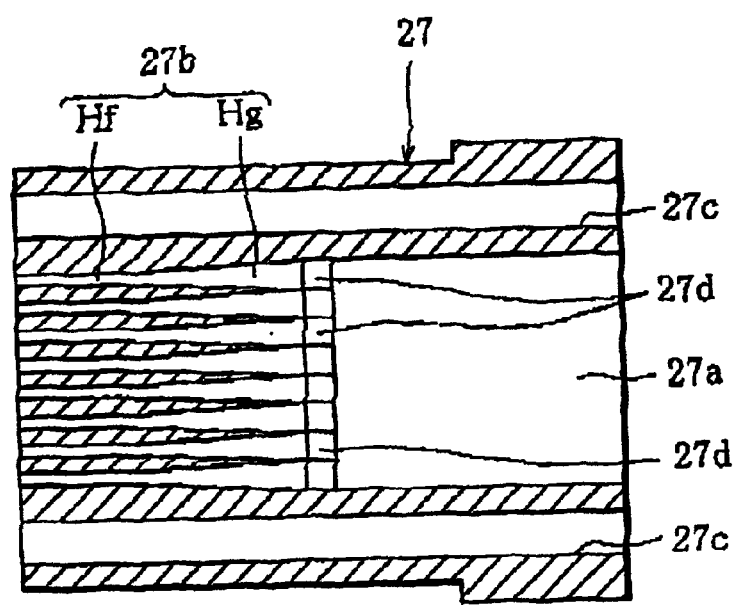
FIG. 11 is a cross-sectional view of a fifth ferrule according to the present invention.

As shown in FIG. 11, each fiber hole 27b has a guide hole portion Hg and a minute hole portion Hf whose inside diameter is smaller than that of the guide hole portion Hg. The guide hole portion Hg is tapered in such a way that the inside diameter becomes smaller continuously toward the minute hole portion Hf.

When the ferrule 27 is butt-jointed to another optical connector ferrule, positioning guide pins (not shown) are inserted in the pin holes 27c.

In molding the ferrule 27 with the above-described structure, a clearance (space) is produced to the left of the guide hole portion Hg in FIG. 11 between the adjoining ones of the molding pins that form the fiber holes 27b and are laid in the cavity of the mold. At the time of molding the ferrule 27, therefore, the resin flows into the space between the upper and lower rows of molding pins through the clearance. Like the ferrule 20, the ferrule 27 ensures stable positioning of the molding pins for forming the fiber holes 27b so that the fiber holes 27b are formed with a high accuracy.

The foregoing description of the first ferrule has discussed the method of producing a ferrule with a single row of four fiber holes or a ferrule with two rows of fiber holes, each row having four fiber holes. However, the number of fiber holes in each row in the first ferrule is not limited to four. It is needless to say that each of the first to fifth ferrules may have three or more rows of fiber holes.

What is claimed is:

1. A ferrule comprising plural groups of fiber holes for insertion of optical fibers formed at predetermined intervals, each group having a plurality of fiber holes, each fiber hole having a guide hole portion and a minute hole portion whose inside diameter is smaller than that of said guide hole portion, said guide hole portion having a taper portion formed on a minute hole portion side in such a way that said taper portion is tapered toward said minute hole portion and has a length Lt set to $1 \geq Lt/Lg \geq 1/3$ where Lg is a total length of said guide hole portion.

2. A ferrule of claim 1, wherein said guide hole portion being formed in such a way that said inside diameter thereof becomes smaller in a stepwise manner toward said minute hole portion.

3. A ferrule of claim 1, wherein said guide hole portion being formed in such a way that said inside diameter thereof becomes smaller continuously toward said minute hole portion.

4. The ferrule of claim 1, further comprising:

pin holes for insertion of guide pins;

an opening which communicates with said plural groups of fiber holes and through which an adhesive for securely adhering said optical fibers in said fiber holes is injected; wherein said plural groups of fiber holes are arranged in plural rows for insertion of optical fibers formed at predetermined intervals, each row having a subset of said plurality of fiber holes formed between said pin holes, wherein, each fiber hole having the guide hole portion with said minute hole portion whose inside diameter is smaller than that of said guide hole portion.

\* \* \* \* \*